United States Patent
Izaki (10) Patent No.: US 8,457,085 B2
(45) Date of Patent: Jun. 4, 2013

(54) WIRELESS CONNECTING SYSTEM FOR CONNECTING NETWORK APPARATUS TO WIRELESS NETWORK AND NETWORK APPARATUS USED IN WIRELESS CONNECTING SYSTEM

(75) Inventor: Takeshi Izaki, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1254 days.

(21) Appl. No.: 12/190,185

(22) Filed: Aug. 12, 2008

(65) Prior Publication Data

US 2009/0046686 A1    Feb. 19, 2009

(30) Foreign Application Priority Data

Aug. 13, 2007  (JP) ................. 2007-210665

(51) Int. Cl.
    *H04W 4/00*    (2009.01)
(52) U.S. Cl.
    USPC ............................ 370/338; 455/420; 709/220
(58) Field of Classification Search
    None
    See application file for complete search history.

(56) References Cited

U.S. PATENT DOCUMENTS

| | | |
|---|---|---|
| 2005/0148326 A1 | 7/2005 | Nogawa et al. |
| 2006/0153156 A1 | 7/2006 | Wentink et al. |
| 2007/0204045 A1* | 8/2007 | Shima ........................... 709/226 |
| 2008/0024591 A1* | 1/2008 | Doi et al. .................... 348/14.01 |

FOREIGN PATENT DOCUMENTS

| | | |
|---|---|---|
| EP | 1 307 003 A2 | 5/2003 |
| JP | 2002-297465 A | 10/2002 |
| JP | 2005-174134 | 6/2005 |
| JP | 2007-074390 A | 3/2007 |

OTHER PUBLICATIONS

European Search Report issued in European Patent Application No. EP 08 25 2670.8, mailed Feb. 4, 2009
Stevens, R., "TCP/IP Illustrated, vol. 1—The Protocols", Professional Computing Series, Jan. 1994, pp. 33-51 and pp. 85-96, Addison-Wesley, US.
JP Office Action mailed Apr. 3, 2012, JP Appln. 2007-210665, English translation.

* cited by examiner

*Primary Examiner* — Kevin C Harper
*Assistant Examiner* — Rhonda Murphy
(74) *Attorney, Agent, or Firm* — Banner & Witcoff, LD.

(57) ABSTRACT

A wireless connecting system includes a first network apparatus connected to a wireless network and a second network apparatus to be connected to the wireless network. The first network apparatus stores a network wireless setting and an ad-hoc wireless setting. The second network apparatus stores the same ad-hoc wireless setting as that stored in the first network apparatus. The first network apparatus sends the network wireless setting using the ad-hoc wireless setting. The second network apparatus receives the network wireless setting using the ad-hoc wireless setting, determines whether or not the received network wireless setting is adaptive in the second network apparatus, and sends the determination result using the ad-hoc wireless setting. The first network apparatus receives the determination result using the ad-hoc wireless setting, and outputs the received determination result.

13 Claims, 6 Drawing Sheets

| List of Unset Devices | |
| --- | --- |
| Product Type | BSSID |
| MFC-9999CDW | 00-15-35-B4-46-01 |
| HL-9980DW | 00-15-35-B4-47-08 |
| MFC-9990CDW | 00-15-35-B4-46-05 |

Select with Up/Down Key
Confirm with OK Key

FIG. 6

```
Network Connection Setting

MFC-9990CDW      00:15:35:B4:46:05

IP Acquiring  AUTO [STATIC] DHCP RARP BOOTP APIPA
Method
IP Address         192.168.111.003
Subnet Mask        255.255.000.000
Gateway            192.168.111.001

Confirm with OK Key/Return with Cancel
```

FIG. 7

```
Network Connection Setting

MFC-9990CDW      00:15:35:B4:46:05

IP Acquiring  AUTO [STATIC] DHCP RARP BOOTP APIPA
Method
IP Address         192.168.111.003
Subnet Mask        255.255.000.000
Gateway            192.168.111.001
 [This Setting Is Not Adaptive to the Setting of This Apparatus,OK?]
   Confirm with OK Key/Return with Cancel
```

WIRELESS CONNECTING SYSTEM FOR CONNECTING NETWORK APPARATUS TO WIRELESS NETWORK AND NETWORK APPARATUS USED IN WIRELESS CONNECTING SYSTEM

CROSS-REFERENCE TO RELATED APPLICATION

This application claims priority to Japanese Patent Application No. 2007-210665 filed on Aug. 13, 2007, the contents of which are hereby incorporated by reference into the present application.

BACKGROUND OF THE INVENTION

1. Field of the Invention

The technique disclosed in the present specification relates to a wireless connecting system for connecting a network apparatus to a wireless network, and a network apparatus used in the wireless connecting system. Note that the term "network apparatus" in this specification is an apparatus capable of communicating information by wireless communication, and the term "wireless network" refers to a network apparatus group constituted of two or more network apparatuses wirelessly communicable to each other. Therefore, the minimum wireless network is constituted of two network apparatuses. "The network apparatus is connected to the wireless network" means that the network apparatus is one of the devices that constitutes the wireless network. Therefore, "connect the network apparatus to the wireless network" means that the network apparatus joins the wireless network as one of the device(s) that constitutes the wireless network.

2. Description of the Related Art

A wireless network such as a wireless LAN in which wireless communication is performed among a plurality of network apparatuses is known. In the case of wirelessly sending information from the network apparatus, radio signals may reach a network apparatus outside the wireless network (network apparatus of the other persons, for example). Therefore, a typical wireless network has a predetermined wireless setting that is commonly used among the constitutive network apparatuses of the wireless network. The wireless setting is a regulation (authentication scheme or encryption scheme, for example) for wireless communication. For sending information wirelessly from a network apparatus to another network apparatus, a corresponding wireless setting is necessary between the receiving side and the sending side in order to receive the right information. In the following, the wireless setting that is common among constitutive network apparatuses of a wireless network shall be referred to as network wireless setting. Constitutive network apparatuses of a wireless network communicate wirelessly with each other using the network wireless setting. Therefore, even if radio signals reach a network apparatus that is external to the wireless network, the information sent is unreadable by the apparatus. For connecting a new network apparatus to such a wireless network (specifically, in the case of a new network apparatus to join the wireless network), it is necessary to make the new network apparatus wirelessly communicable in accordance with the network wireless setting.

US Patent Application Publication No. 2005/148326 discloses a wireless connecting system in which a new network apparatus can be connected to a wireless network of an infrastructure mode (mode in which network apparatuses communicate wirelessly by means of an access point). In this wireless connecting system, a predetermined network apparatus that constitutes a wireless network (hereinafter referred to as a sending side network apparatus) is wirelessly connected to the new network apparatus in an ad-hoc mode (mode in which network apparatuses make one-to-one wireless communication without an access point). The sending side network apparatus wirelessly sends the network wireless setting of wireless network (more specifically, the authentication scheme or the encryption scheme of the infrastructure mode is sent; which hereinafter is referred to as an infrastructure wireless setting) in accordance with ad-hoc wireless setting. The new network apparatus receives the infrastructure wireless setting in accordance with ad-hoc wireless setting. Therefore the new network apparatus becomes possible to wirelessly communicate in accordance with the received infrastructure setting. Specifically, the new network apparatus can be connected to a wireless network of the infrastructure mode.

BRIEF SUMMARY OF THE INVENTION

Even with the technology of the above-described document, there are cases where the new network apparatus cannot be connected to the existing wireless network (the wireless network of the infrastructure mode in the above-described example) due to various reasons.

The technique disclosed in the present specification provides a wireless connecting system capable of identifying the connection failure in the case where the new network apparatus cannot be connected to the existing wireless network.

The inventors of the present technique looked to the fact that plural types of network wireless setting (a plural types of authentication scheme, for example) exist and not all of such network apparatuses can use all types of the network wireless setting. For example, even if the sending side network apparatus sends an authentication scheme used in a wireless network where the sending side network apparatus belongs, there are cases where the new network apparatus cannot use the authentication scheme. Specifically, there may be cases where a new network apparatus cannot be connected to wireless network, since the new network apparatus does not support the network wireless setting used in the existing wireless network. The wireless connecting system disclosed in the present specification is capable of outputting information on such connection failure that a network apparatus to be set cannot be connected to a wireless network. The constitution of the system is described in the following.

The wireless connecting system disclosed in this specification comprises a first network apparatus connected to a wireless network and a second network apparatus being configured to communicate wirelessly, of which is to be connected to the wireless network. The first network apparatus comprises a network wireless setting storing device, a first ad-hoc wireless setting storing device, a network wireless setting sending device, a determination result receiving device, and a determination result outputting device. The second network apparatus comprises a second ad-hoc wireless setting storing device, a network wireless setting receiving device, a determination device, and a determination result sending device. The network wireless setting storing device stores a network wireless setting for communicating wirelessly using the wireless network. The first ad-hoc wireless setting storing device stores an ad-hoc wireless setting. The second ad-hoc wireless setting storing device stores the same ad-hoc wireless setting as that stored in the first ad-hoc setting device. The network wireless setting sending device sends the network wireless setting stored in the network wireless setting storing device to the second network apparatus using the ad-hoc wireless setting. The network wireless setting receiving device receives the network wireless setting sent from the first network apparatus using the ad-hoc wireless setting. The determination device determines whether or not the network wireless setting received by the network wireless setting receiving device is adaptive in the second network apparatus. The determination result sending device sends the determination result achieved by the determination device to the first network apparatus using the ad-hoc wireless setting. The determination result receiving device receives the determination result sent from the second network apparatus using the ad-hoc wireless setting. The determination result outputting device outputs the determination result received by the determination result receiving device. Note that the term "output" means sending information to another device (a device inside the first network apparatus or a device separately constituted from the first network apparatus). Sending information to another device (specifically, outputting) allows the receiving side device to perform processing. For example, when information is sent (outputted) to a display unit such as an LCD, the display unit can display a message or the like corresponding to the information. For example, when the information is sent (outputted) to a printing unit such as a printer, the printing unit can print a message or the like that corresponds to the information. For example, when the information is sent (outputted) to a wireless sending device, the information is wirelessly sent and a device which received the information is allowed to perform an action corresponding to the information. As described above, "output" means sending information to various devices.

In this wireless connecting system, the first network apparatus and the second network apparatus store the identical ad-hoc wireless setting. In the procedure of connecting the second network apparatus to the network in which the first network apparatus is connected to, by using this ad-hoc wireless setting, the first network apparatus can wirelessly communicate with the second network apparatus. By means of this wireless communication of the ad-hoc mode, the network wireless setting is sent from the first network apparatus to the second network apparatus. Specifically, the network wireless setting of the wireless network where the first network apparatus belongs is sent to the second network apparatus. Then the second network apparatus becomes possible to communicate in accordance with the received network wireless setting. However, there are cases where the second network apparatus cannot use the received network wireless setting. Therefore, the determination device of the second network apparatus determines whether or not the network wireless setting is adaptive in the second network apparatus. Then, this determination result is sent to the first network apparatus in accordance with the ad-hoc wireless setting. The first network apparatus can receive and output the determination result. If a negative determination result is output, the user can learn therefrom that the second network apparatus does not support the network wireless setting of the existing wireless network. The user can take other measures for connecting the second network apparatus to the wireless network (changing the network wireless setting, for example).

DETAILED DESCRIPTION OF THE INVENTION (Embodiment)

Figure 1:
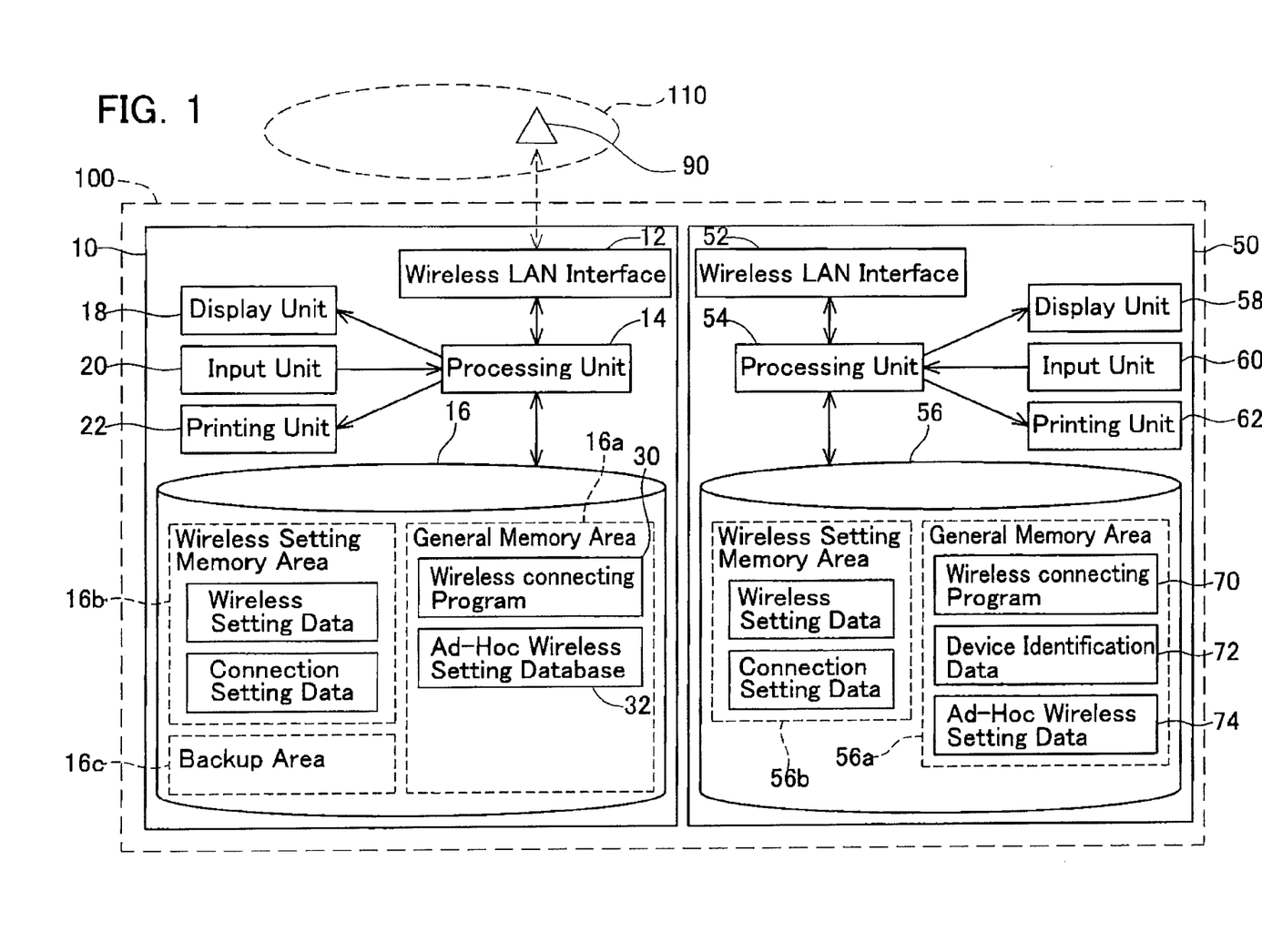
FIG. 1 is a block diagram of a wireless connecting system 100.

A wireless connecting system of the embodiment is described referring to the drawings. FIG. 1 is the block diagram showing a schematic constitution of the wireless connecting system 100 of the embodiment. The wireless connecting system 100 has a first printer 10 and a second printer 50. Both of the first printer 10 and the second printer 50 have a wireless LAN function, and can communicate wirelessly with an external apparatus. The first printer 10 is connected to a wireless network 110. The wireless network 110 is constituted of a plurality of network apparatuses (for example, personal computer, printer, scanner and the like, not shown in FIG. 1) wirelessly communicable to each other via an access point 90. Specifically, the first printer 10 can perform wireless communication with the network apparatus that constitutes the wireless network 110 (specifically, wireless communication of infrastructure mode) via the access point 90. In other words, the first printer 10 constitutes a part of the wireless network 110. The second printer 50 is not connected to the wireless network 110. As described above, the second printer 50 has wireless LAN function. Therefore, by changing the setting of the second printer 50, the second printer 50 can be connected to the wireless network 110. According to the wireless connecting system 100, the second printer 50 can be easily connected to the wireless network (the wireless network 110 in this example) to which the first printer 10 is connected.

The first printer 10 includes a wireless LAN interface 12, a processing unit 14, a memory unit 16, display unit 18, an input unit 20, and a printing unit 22.

The wireless LAN interface 12 is constituted of a radio antenna that sends and receives radio signals (radio waves) and a control circuit that controls the radio antenna, or the like. The wireless LAN interface 12 is connected to the processing unit 14. The wireless LAN interface 12 receives data input from the processing unit 14, and wirelessly sends the input data to other apparatus that is external to the first printer 10. Also, the wireless LAN interface 12 receives the data wirelessly sent from such an external apparatus and outputs the data to the processing unit 14. The wireless LAN interface 12 communicates wirelessly in accordance with a wireless setting set (stored) in a wireless setting memory area 16b (described later in detail) of the memory unit 16.

The processing unit 14 is connected to the wireless LAN interface 12, the memory unit 16, the display unit 18, the input unit 20 and the printing unit 22. The processing unit 14 performs various operations, controls each unit of the first printer 10, inputs data to each unit of the first printer 10, and outputs data from each unit of the first printer 10.

The memory unit 16 can store various data. The data stored in the memory unit 16 may be read out by the processing unit 14. Further, the data input from the processing unit 14 may be received and stored by the memory unit 16. The memory unit 16 includes a general memory area 16a, the wireless setting memory area 16b, and a backup area 16c.

In the general memory area 16a, a wireless connecting program 30 and an ad-hoc wireless setting database 32 are stored. The wireless connecting program 30 is a program for connecting an external network apparatus to the wireless network to which the first printer 10 is connected (the wireless network 110 in this example). The wireless connecting program 30 is read out and performed by the processing unit 14. The ad-hoc wireless setting database 32 is a database which describes a plurality of patterns of ad-hoc wireless setting data in a state that each pattern of the ad-hoc wireless setting data corresponds to unique device identification data. The device identification data identifies a type of network apparatus. The ad-hoc wireless setting data indicates an ad-hoc wireless setting that can be used by the network apparatus whose type is identified by the device identification data corresponding thereto. The ad-hoc wireless setting is used when network apparatuses perform ad-hoc wireless communication between each other (mode in which network apparatuses wirelessly communicate in an one-to-one manner). Ad-hoc wireless communication is established by wireless communication in accordance with an identical ad-hoc wireless setting that is equipped by both of the network apparatuses. It should be noted that, there may be a case in which one type of ad-hoc wireless setting data corresponds to a device identification data while another type of ad-hoc wireless setting data corresponds to that same device identification data. As in the aforementioned case, the ad-hoc wireless setting database 32 may store a plurality of ad-hoc wireless setting data that corresponds to a common device identification data.

In the wireless setting memory area 16b, wireless setting data and connection setting data are stored. The wireless setting data indicates a wireless setting utilized by the wireless LAN interface 12 to communicate wirelessly. In particular, the wireless setting data describes an SSID, an authentication scheme and an encryption scheme. The SSID is an ID (network ID, for example) for communicating wirelessly. The authentication scheme is a method (regulation) for permitting wireless communication. The encryption scheme is a data encryption method in communicating wirelessly (encryption regulation). The encryption scheme may include keywords (character strings) used in data encryption and decryption. Sending and receiving radio signals in accordance with the common wireless communication settings (SSID, the authentication scheme, the encryption scheme) enables wireless communication among network apparatuses. The wireless setting memory area 16b stores various wireless setting data, such as network wireless setting data for communicating wirelessly in the wireless network 110 and ad-hoc wireless setting data for performing ad-hoc wireless communication. The connection setting data is utilized in identifying a network apparatus. In particular, the connection setting data describes an IP address, a subnet mask or the like of the first printer 10. In the case of connecting the first printer 10 to an external network (network other than the wireless network 110 such as the Internet, for example), a gateway may also be included in the connection setting data. The wireless setting memory area 16b can store only one each of the wireless setting data and the connection setting data. In other words, when new wireless setting data is stored in the wireless setting memory area 16b, previous wireless setting data is cleared from the wireless setting memory area 16b. Similarly, when new connection setting data is stored in the wireless setting memory area 16b, previous connection setting data is cleared. As described above, the wireless LAN interface 12 communicates wirelessly in accordance with the wireless setting (the wireless setting data) and the connection setting (the connection setting data) which are stored in the wireless setting memory area 16b. Therefore, by re-writing the wireless setting data and the connection setting data which are stored in the wireless setting memory area 16b, the setting for the wireless LAN interface 12 in wireless communication is changed.

The backup area 16c can store various data. Important data is temporarily backed up in the backup area 16c in the setting change of the first printer 10.

The display unit 18 is a liquid crystal display, which displays information in response to a command inputted from the processing unit 14.

The input unit 20 is constituted of a plurality of input buttons or the like. By user's operation of one or more input buttons, a command is inputted from the input unit 20 to the processing unit 14.

The printing unit 22 is mainly constituted of a paper tray, a paper carrying mechanism, an inkjet head, an inkjet head driving mechanism and the like. The printing unit 22 carries paper housed in the paper tray to the inkjet head, and prints an image on paper by means of the inkjet head. The printing unit 22 executes printing in response to one or more command(s) inputted from the processing unit 14.

The second printer 50 is similarly constituted as the schematic constitution of the first printer 10. In other words, the second printer 50 includes a wireless LAN interface 52, a processing unit 54, a memory unit 56, a display unit 58, an input unit 60 and a printing unit 62.

The wireless LAN interface 52 receives data input from the processing unit 54, and wirelessly sends the inputted data to other apparatus that is external to the second printer 50. The radio signals sent from the external apparatus is received and input to the processing unit 54 by the wireless LAN interface 52. The wireless LAN interface 52 communicates wirelessly in accordance with a wireless setting set to a wireless setting memory area 56b (described later in detail) of the memory unit 56.

The processing unit 54 is connected to the wireless LAN interface 52, the memory unit 56, the display unit 58, the input unit 60 and the printing unit 62. The processing unit 54 executes various operations, controls each unit of the second printer 50, inputs data to each unit of the second printer 50, and outputs data from each unit of the second printer 50.

The memory unit 56 can store various data. The memory unit 56 is equipped with a general memory area 56a and the wireless setting memory area 56b.

In the general memory area 56a, a wireless connecting program 70, device identification data 72 and ad-hoc wireless setting data 74 are stored. The wireless connecting program 70 is for connecting the second printer 50 to a wireless network (the wireless network 110 in this example). The wireless connecting program 70 is readout and performed by the processing unit 54. The device identification data 72 is for identifying a type of the second printer 50. In this example, the device identification data 72 is constituted of a MAC address and a product type name (model number indicating a type of the second printer 50) of the second printer 50. The ad-hoc wireless setting data 74 indicates a wireless setting used by the second printer 50 in ad-hoc wireless communication. In the ad-hoc wireless setting data 74, an SSID (ad-hoc ID: also referred to as BSSID), the authentication scheme and the encryption scheme are described. In this example, the ad-hoc wireless setting data 74 describes a MAC address of the second printer 50 as the SSID, Open System as the authentication scheme, and WEP as the encryption scheme.

In the wireless setting memory area 56b, the wireless setting data and the connection setting data are set (stored). The wireless LAN interface 52 communicates wirelessly in accordance with wireless setting (wireless setting data) and the connection setting (connection setting data), which are set to the wireless setting memory area 56b. For example, when the ad-hoc wireless setting data 74 which is stored by the general memory area 56a is set to the wireless setting memory area 56b, the wireless LAN interface 52 executes wireless communication in accordance with the ad-hoc wireless setting (the ad-hoc wireless setting data) 74.

The display unit 58 is a liquid crystal display, and displays information in response to a command inputted from the processing unit 54.

The input unit 60 is constituted of a plurality of input buttons or the like. By user's operation of one or more input buttons, a command is inputted from the input unit 60 to the processing unit 54.

The printing unit 62 executes printing in response to one or more command(s) inputted from the processing unit 54.

Next, the process of connecting the second printer 50 to the wireless network 110 by the wireless connecting system 100 is described. Before starting this processing, the first printer 10 is connected to the wireless network 110. Therefore, the wireless setting memory area 16b of the first printer 10 stores the wireless setting data used in the wireless network 110 (which hereinafter is referred to as network wireless setting data 110a) and the connection setting data used in the wireless network 110 (which hereinafter is referred to as network connection setting data 110b). In this example, the network wireless setting data 110a describes NETWORK as the SSID, WPA-PSK as the authentication scheme, and TKIP as the encryption scheme. Further, the second printer 50 is initially in the state of no wireless communication. Therefore, no data is stored in the wireless setting memory area 56b of the second printer 50. In starting the process of connecting the second printer 50 to the wireless network 110, the input unit 20 of the first printer 10 is operated to allow the processing unit 14 to perform the wireless connecting program 30. Further, the input unit 60 of the second printer 50 is operated to allow the processing unit 54 to perform the wireless connecting program 70. Thus, the first printer 10 and the second printer 50 perform the wireless connecting processing shown in the flowcharts of FIG. 2 and FIG. 3. Note that the arrows in broken lines in the flowcharts of FIG. 2 and FIG. 3 indicate sending and receiving of data between the first printer 10 and the second printer 50. Although not shown in the flowcharts of FIG. 2 and FIG. 3, the first printer 10 and the second printer 50 may cease the processing when an error or the like occurs (for example, the case where expected data cannot be received even after a predetermined time).

Figure 2:
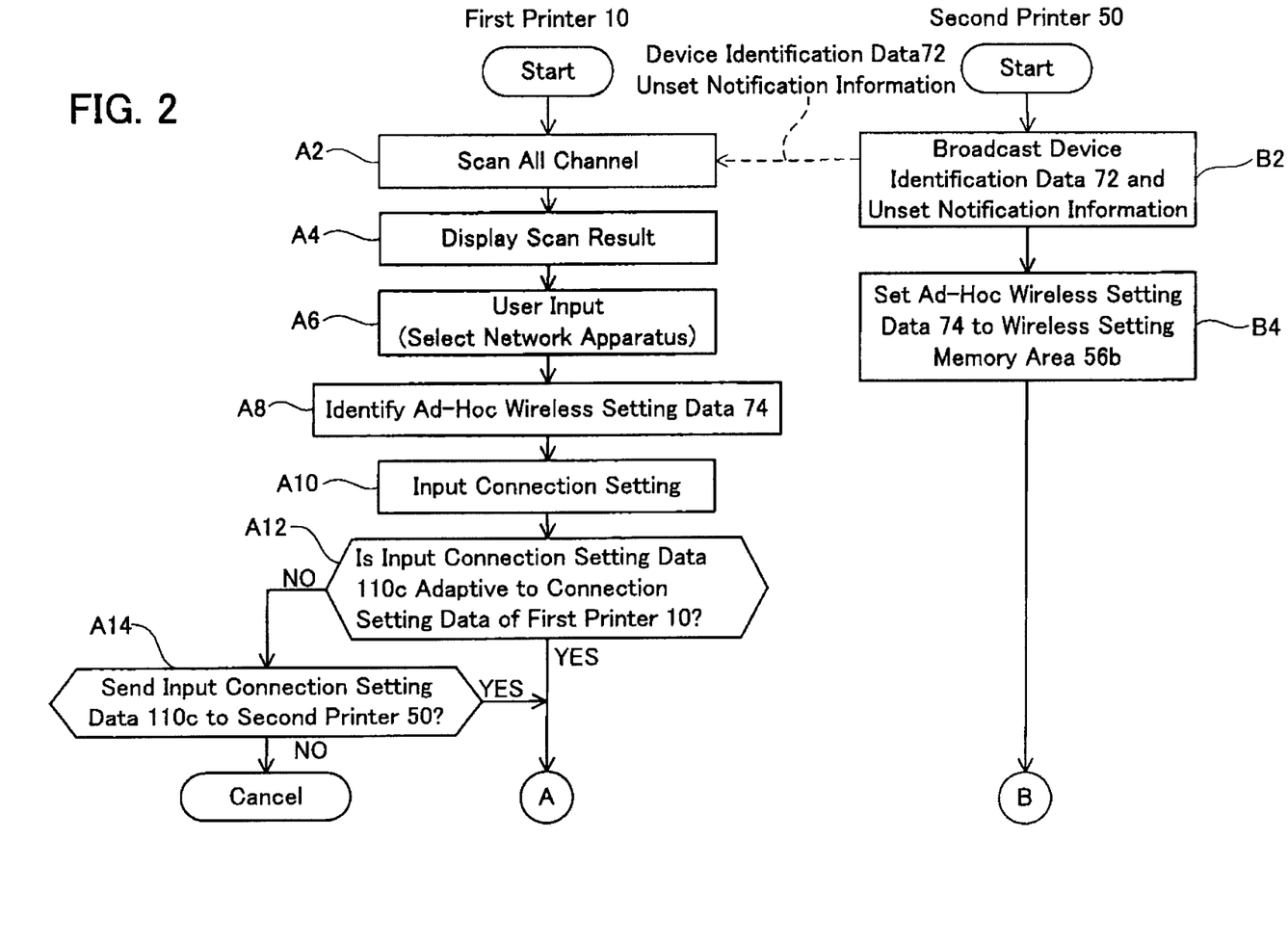
FIG. 2 is a flowchart (first half process) of the wireless connecting processing.

At step B2, the second printer 50 broadcasts the device identification data 72 and data indicating that the second printer 50 is not connected to the wireless network (hereinafter referred to as unset notification data) through a predetermined channel. It is not necessary for wireless communication by means of broadcasting to set the wireless setting and the connection setting (in other words, it is not necessary to have the wireless setting data and the connection setting data stored in the wireless setting memory area 56b to perform broadcasting). On the other hand, the first printer 10 scans radio signals by means of broadcasting through all channels (step A2). Thus, the first printer 10 receives the device identification data 72 and the unset notification data wirelessly sent from the second printer 50. Further, in a case where another set of the device identification data and the unset notification data is also broadcasted from a network apparatus other than the second printer 50, the first printer 10 also receives this set of data.

After broadcasting the device identification data 72 and the unset notification information for a predetermined time, the second printer 50 sets the ad-hoc wireless setting data 74 stored in the general memory area 56a to the wireless setting memory area 56b at step B4. Thus, the wireless LAN interface 52 of the second printer 50 enters an ad-hoc wirelessly communicable state in accordance with the ad-hoc wireless setting 74.

Figure 5:
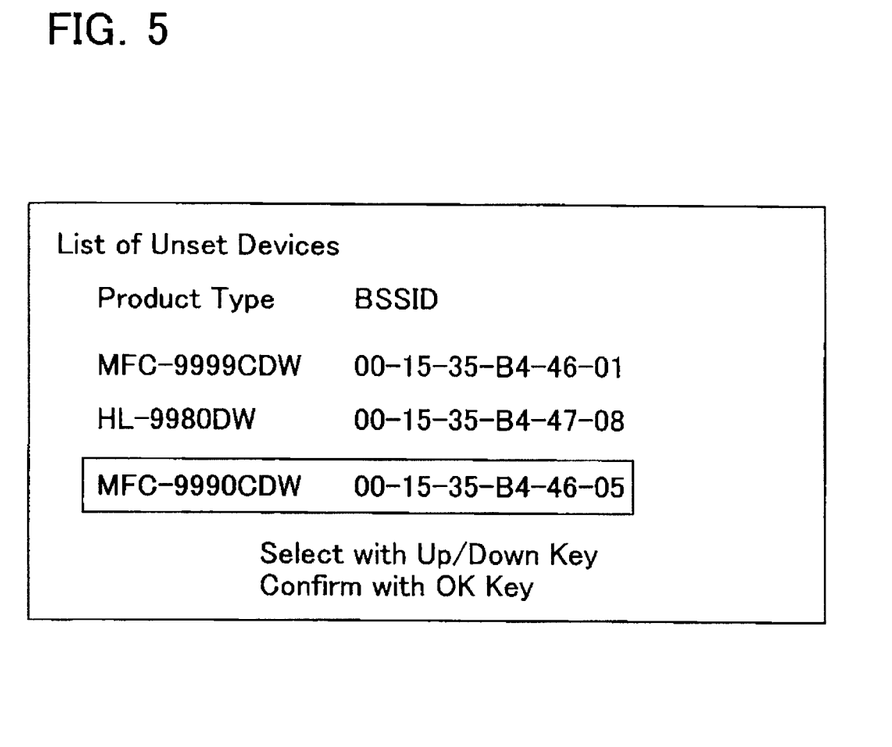
FIG. 5 is an example of a display screen.

After all-channel scan at step A2 is completed, the first printer 10 displays the device identification data 72 received during all-channel scan on the display unit 18 at step A4 (specifically, the MAC address and the product type name of the second printer 50 is displayed). In the case where the printer has received a plurality of device identification data at step A2, a list of the received plurality of device identification data is displayed. FIG. 5 shows the example of the displayed list, in which three devices are displayed as an example. In this example, it is assumed that the product type "MFC-9990CDW" of FIG. 5 corresponds to the second printer 50.

After displaying the device identification data at step A4, the first printer 10 enters a waiting state for an input by the user (step A6). The user can operate the input unit 20 and select the desired network apparatus to be connected to the wireless network 110 from network apparatuses displayed on the display unit 18. Herein, the following processing is described as for the case where the second printer 50 (specifically, the product type "MFC-9990CDW") is selected by the user.

After the second printer 50 is selected at step A6, the first printer 10 identifies the ad-hoc wireless setting data 74 of the second printer 50 (step A8). In other words, the processing unit 14 of the first printer 10 reads out the ad-hoc wireless setting database 32 from the memory unit 16. As described above, the ad-hoc wireless setting database 32 describes the device identification data and the ad-hoc wireless setting data in an associated manner. The processing unit 14 identifies the ad-hoc wireless setting data 74 out of the large number of ad-hoc wireless setting data included in the ad-hoc wireless setting database 32, based on the device identification data 72 received at step A2.

Figure 6:
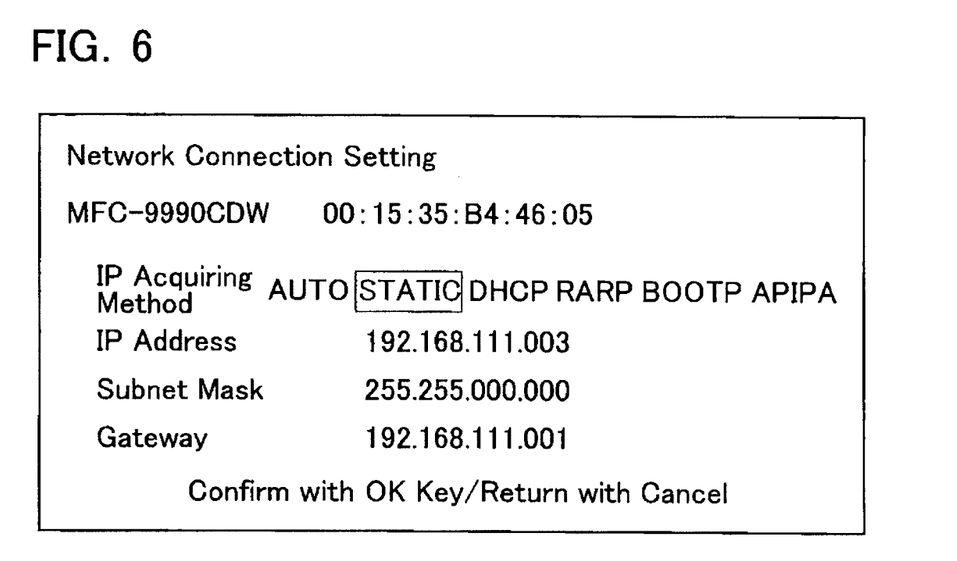
FIG. 6 is another example of a display screen.
Figure 7:
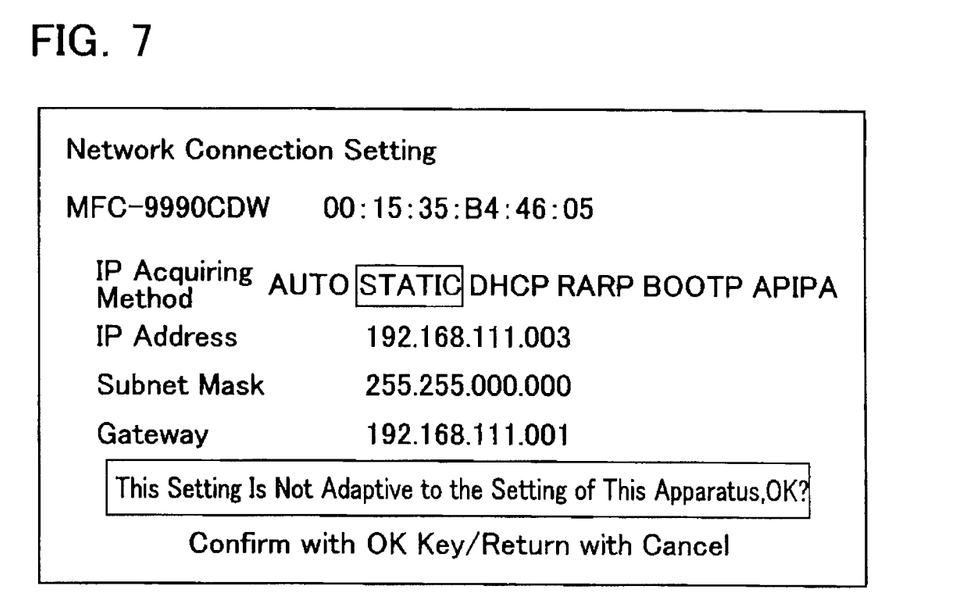
FIG. 7 is another example of a display screen.

When step A8 is completed, the first printer 10 enters a waiting state for an input of a network connection setting (step A10). FIG. 6 shows the example of an input screen of the network connection setting. At step A10, the network connection setting to be sent to the second printer 50 (specifically, network connection setting that the second printer 50 will use later) is inputted to the first printer 10. As the network connection setting of the present example, an IP address and a subnet mask to be allocated for the second printer 50 are inputted. Further, a gateway is inputted on demand. The input of the network connection setting can be performed by the user's operation to the input unit 20. Further, the user can select one out of a plurality of IP address acquiring methods ("AUTO", "STATIC" or the like of FIG. 6). Note that, in the case where a DHCP server is installed in the wireless network 110, data of a network connection setting, which has been automatically determined by the DHCP server, can be also received via the wireless network 110. Hereinafter, the network connection setting inputted at step A10 is referred to as network connection setting (network connection setting data) 110c. In a case where the data of the network connection setting, which has been automatically determined by the DHCP server, is received via the wireless network 110, an input of the network connection setting by the input unit 20 is omitted at step A10.

After the network connection setting 110c is inputted at step A10, the processing unit 14 of the first printer 10 determines whether or not the inputted network connection setting 110c is adaptive to the network connection setting 110b of the first printer 10 itself, which is stored in the wireless setting memory area 16*b* (step A12). The processing unit 14 performs determination processes regarding the four points as follows:

(1) The processing unit 14 determines whether or not the IP address of the network connection setting 110*c* is identical to the IP address of the network connection setting 110*b*. In the example in FIG. 6, the IP address of the network connection setting 110*c* is "192.168.111.003". If the IP address of the network connection setting 110*c* has an identical value as the IP address of the network connection setting 110*b*, the determination of 'NO' is made at step A12.

(2) The processing unit 14 determines whether or not the subnet mask of the network connection setting 110*c* matches the subnet mask of the network connection setting 110*b*. In the case of the example in FIG. 6, the subnet mask of the network connection setting 110*c* is "255.255.000.000". If the subnet mask of the network connection setting 110*c* has a different value from the subnet mask of the network connection 110*b*, the determination of 'NO' is made at step A12.

(3) The processing unit 14 determines whether or not a part of the IP address of the network connection setting 110*c*, which is corresponding to the numerical value "255" of the subnet mask, matches a part of the IP address of the network connection setting 110*b*, which is corresponding to the numerical value "255" of the subnet mask. In the example in FIG. 6, "255.255" is set to the upper 6 digits of the subnet mask of the network connection setting 110*c*. In this case, whether or not the upper 6 digits "192.168" of the IP address of the network connection setting 110*c* matches the upper 6 digits of the IP address of the network connection setting 110*b* is determined. If they do not match, the determination of 'NO' is made at step A12.

(4) In the case where the network connection setting 110*c* includes a gateway, the processing unit 14 determines whether or not the gateway of the network connection setting 110*c* matches the gateway of the network connection setting 110*b*. In the example in FIG. 6, the gateway of the network connection setting 110*c* is "192.168.111.001". In a case where the gateway of the network connection setting 110*c* has a value different from the gateway of the network connection setting 110*b*, the determination of 'NO' is made at step A12.

As described in (1) to (4) of the above, in the case where the network connection setting 110*c* is not adaptive to the network connection setting 110*b*, it is determined 'NO' at step A12. In this case, step A14 is performed. On the other hand, in the case where the network connection setting 110*c* is adaptive to the network connection setting 110*b*, is determined 'YES' at step A12. Specifically, in the case where, between the network connection setting 110*c* and the network connection setting 110*b*, IP addresses are not identical, subnet masks are identical, IP addresses of areas corresponding to subnet masks are identical, and gateways are identical, it is determined 'YES' at step A12. In this case, step A16 is performed.

At step A14, the first printer 10 displays a message indicating that the network connection setting 110*c* is not adaptive to the network connection setting 110*b* of the first printer 10 and a request message for a judgment whether or not the network connection setting data 110*c* should be sent to the second printer 50 on the display unit 18. When the user operates the input unit 20 to select sending the network connection setting data 110*c* to the second printer 50, step A16 is performed ('YES' at step A14). Further, when the user selected not to send the network connection setting data 110*c* to the second printer 50, subsequent processing is canceled ('NO' at step A14).

At step A16, the first printer 10 transfers (backups) the network wireless setting data 110*a* and the network connection setting data 110*b*, which are stored in the wireless setting memory area 16*b*, to the backup area 16*c*.

After the backup at step A16 is completed, the first printer 10 sets (overwrites) the ad-hoc wireless setting data 74 identified at step A8 to the wireless setting memory area 16*b* (step A18). This enters a state where only the ad-hoc wireless setting data 74 is stored in the wireless setting memory area 16*b*. When the ad-hoc wireless setting data 74 is set to the wireless setting memory area 16*b*, the wireless LAN interface 12 of the first printer 10 is allowed to communicate wirelessly using the ad-hoc wireless setting 74. As described above, the wireless LAN interface 52 of the second printer 50 is already capable of wireless communication at step B4 using the ad-hoc wireless setting 74. Therefore, ad-hoc wireless communication between the first printer 10 and the second printer 50 can be established on completing step A18. For performing ad-hoc wireless communication, connection setting is not necessary (specifically, it is not necessary to store a connection setting data in the wireless setting memory areas 16*b* and 56*b* to perform the aforementioned ad-hoc wireless communication).

Figure 3:
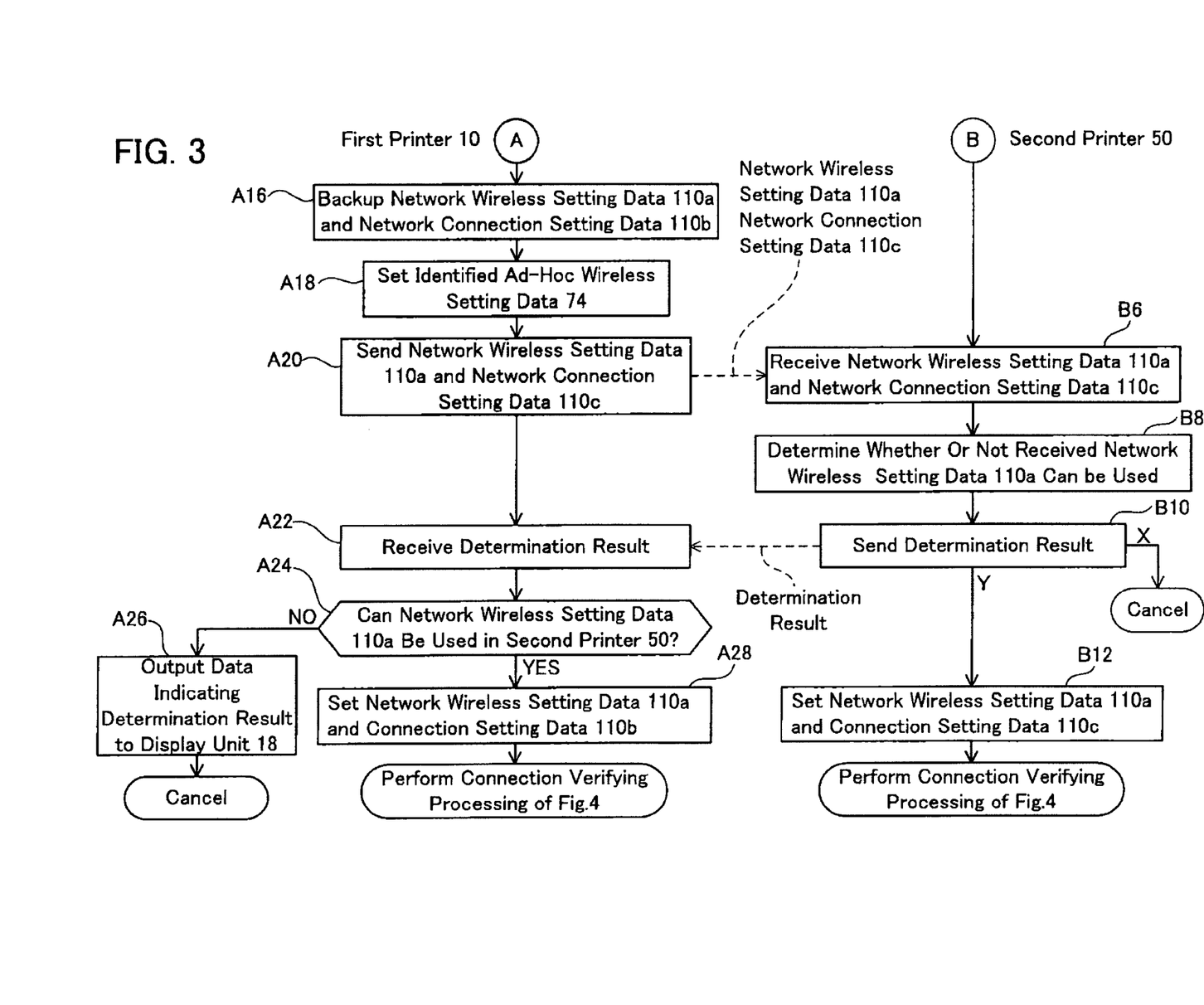
FIG. 3 is a flowchart (last half process) of the wireless connecting processing.

At step A20, the first printer 10 wirelessly sends, to the second printer 50, the network wireless setting data 110*a* stored in the backup area 16*c* and the network connection setting data 110*c* inputted at step A10. The wirelessly sent network wireless setting data 110*a* and network connection setting data 110*c* are received by the second printer 50 (step B6). At step A20 and B6, data is sent and received in accordance with the ad-hoc wireless setting 74. Therefore, data can be sent and received with reliable security.

At step B8, the processing unit 54 of the second printer 50 determines whether or not the network wireless setting 110*a* received at step B6 can be used in the second printer 50 (step B8). For example, in a case where the second printer 50 cannot use the network wireless setting 110*a* due to the configuration limits of each unit of the second printer 50, the processing unit 54 determines that the second printer 50 cannot use the network wireless setting 110*a*. More particularly, in a case where the second printer 50 does not support the authentication scheme described in the network wireless setting 110*a*, the processing unit determines that the second printer 50 cannot use the network wireless setting 110*a*. Further, in a case where the second printer 50 does not support the encryption scheme described in the network wireless setting 110*a*, the processing unit also determines that the second printer 50 cannot use the network wireless setting 110*a*. In other words, with one or more of the aforementioned determination in step B8, the received network wireless setting data 110*a* is determined as inapplicable to be used the second printer 50.

At step B10, the second printer 50 wirelessly sends the determination result of the process of step B8 to the first printer 10. The first printer 10 receives the determination result sent wirelessly by second printer 50 (step A22). At step B10 and A22, data is sent and received in accordance with the ad-hoc wireless setting 74.

In a case where the determination result received at step A22 indicates that the second printer 50 cannot use the network wireless setting 110*a* ('NO' at step A24), the first printer 10 executes step A26. At step A26, the processing unit 14 outputs data indicating the determination result received at step A22 (determination result indicating that the second printer 50 cannot use the network wireless setting 110*a*) to the display unit 18. Thus, the display unit 18 displays a message indicating the determination result. After completing step A26, the processing unit 14 cancels subsequent processing. In this case, the processing unit 14 returns the setting of each unit of the first printer 10 to a state before performing the aforementioned wireless communication connecting processing. Specifically, the processing unit 14 sets (resets) the network wireless setting data 110*a* and the network connection setting data 110*b*, which have been backed up in the backup area 16*c*, to the wireless setting memory area 16*b*. This enables the first printer 10 to establish wireless communication in the wireless network 110 by again using settings that were previously set for such wireless communication. As described, in the case where the second printer 50 cannot use the network wireless setting 110*a*, the display unit 18 displays a message indicating the state. Therefore, the user can easily learn that the network wireless setting 110*a* causes the connection failure of the second printer 50 to the wireless network 110.

In a case where the determination result received at step A22 indicates that the network wireless setting 110*a* can be used in the second printer 50 ('YES' at step A24), the first printer 10 executes step A28. At step A28, the first printer 10 sets the network wireless setting data 110*a* and the network connection setting data 110*b*, which have been backed up in the backup area 16*c*, to the wireless setting memory area 16*b* again. Thus, the wireless LAN interface 12 of the first printer 10 is allowed to communicate wirelessly in accordance with the network wireless setting 110*a* and the network connection setting 110*b*. Specifically, the first printer 10 is connected to the wireless network 110 again using the settings that had been previously set for such communication.

In a case where the second printer 50 sends wirelessly the determination result that the second printer 50 cannot use the network wireless setting 110*a* at step B10, the second printer 50 cancels subsequent processing as shown by arrow X at step B10 of FIG. 3. In this case, the setting of each unit of the second printer 50 is returned to the state before performing the wireless communication connecting processing. On the other hand, in a case where the second printer 50 sends wirelessly the determination result that the second printer 50 can use the network wireless setting 110*a* at step B10, the second printer 50 executes step B12 as shown by arrow Y at step B10 of FIG. 3. At step B12, the second printer 50 sets the network wireless setting data 110*a* and the network connection setting data 110*c*, which have been received at step B6, to the wireless setting memory area 56*b*. Thus, the wireless LAN interface 52 of the second printer 50 is allowed to communicate wirelessly in accordance with the network wireless setting 110*a* and the network connection setting 110*c*. That is, the second printer 50 is connected to the wireless network 110.

As described above, when the first printer 10 and the second printer 50 perform the wireless communication connecting processing shown in FIG. 2 and FIG. 3, the second printer 50 can be connected to the wireless network 110. However, there may be cases where the second printer 50 is not connected to the wireless network 110 even after performing step B12 due to various causes. For example, in a case where the network connection setting 110*c* inputted at step A10 is inappropriate, the second printer 50 is not connected to the wireless network 110. Specifically, there is a case where the IP address of the network connection setting 110*c* is identical with the IP address of another network apparatus in the wireless network 110 (network apparatus other than the first printer 10), for example. In this case, it is determined as 'YES' at step A12 (because it is not identical with the IP address of the first printer 10). However, because conflict (collision) of IP addresses occurs with another network apparatus, the second printer 50 is not connected to the wireless network 110. Further, there may be cases where the second printer 50 is not connected to the wireless network 110 even when the network connection setting 110*c* is appropriate. In other words, there may be cases where the second printer 50 is in wirelessly communicable position with respect to the first printer 10 but is not in wirelessly communicable position with respect to the access point 90, or the like. Specifically, such condition may occur in a case where a distance between the second printer 50 and the first printer 10 is short but a distance between the second printer 50 and the access point 90 is very long. In this case, since the second printer 50 has a short distance to the first printer 10, processing until step B12 can be performed. However, since the second printer 50 and the access point 90 are located far away from each other, influence of radio wave noise or the like may prevent wireless communication between the second printer 50 and the access point 90. As described above, there may be cases where the second printer 50 is not connected to the wireless network 110 even after performing step B12. Therefore, after completion of respective steps A28 and B12, the first printer 10 and the second printer 50 are able to perform the network connection verifying processing shown in FIG. 4.

Figure 4:
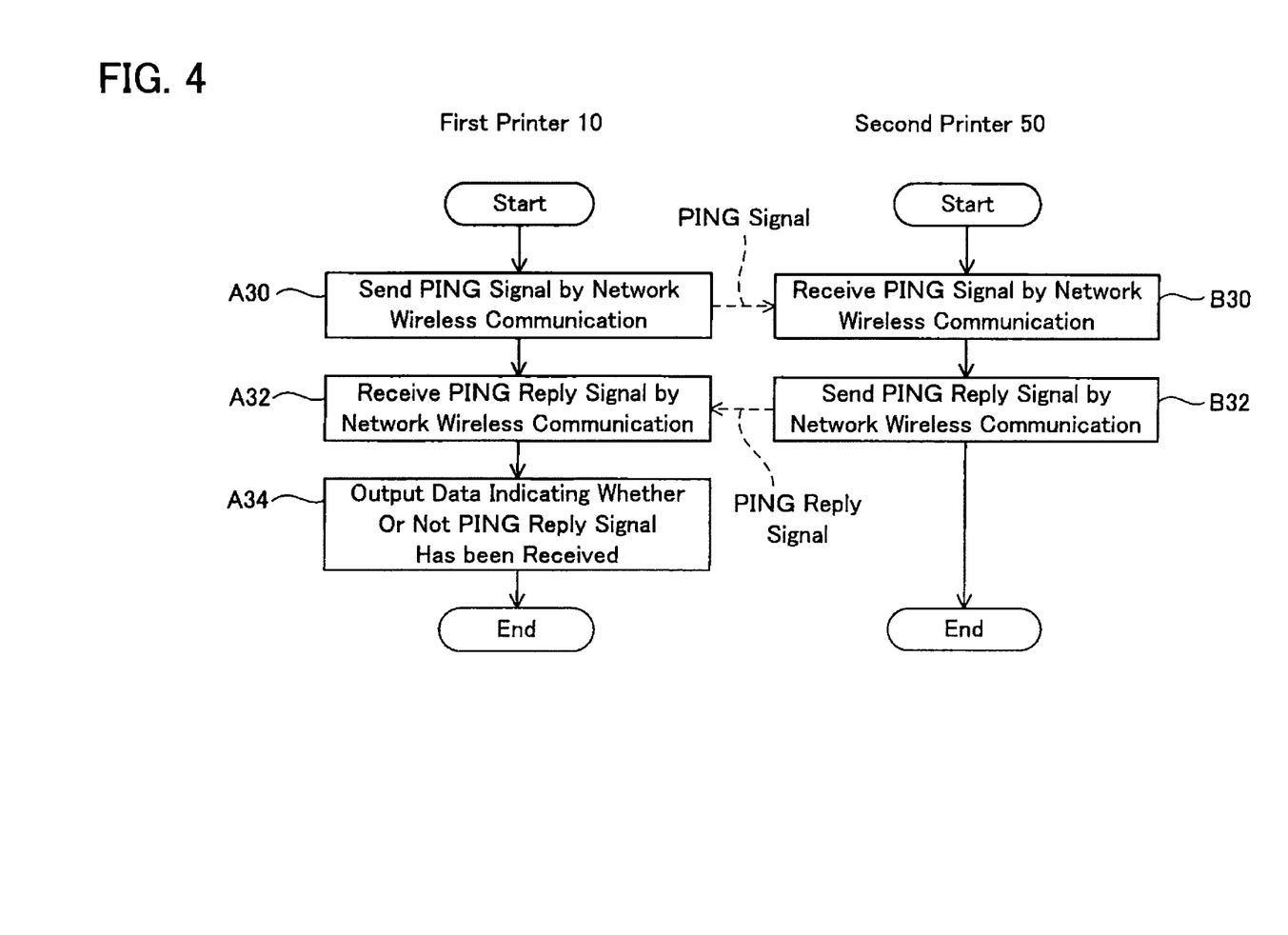
FIG. 4 is a flowchart of the network connection verifying processing.

At step A30 of FIG. 4, the first printer 10 wirelessly sends a PING signal to the second printer 50 via the wireless network 110 (specifically, the access point 90). The second printer 50 receives the wirelessly sent PING signal (step B30). In other words, the PING signal is sent and received at steps A30 and B30 in accordance with the network wireless setting 110*a*. In this case, the first printer 10 uses the network connection setting 110*b*, and the second printer 50 uses the network connection setting 110*c*.

When the second printer 50 receives the PING signal at step B30, the second printer 50 in response wirelessly sends a PING reply signal to the first printer 10 via the wireless network 110 (step B32). The first printer 10 receives the wirelessly sent PING reply signal (step A32). When the first printer 10 receives the PING reply signal at step A32, the processing unit 14 of the first printer 10 outputs information indicating that the PING reply signal has been received to the display unit 18 (step A34). Thus, the display unit 18 displays a message that the second printer 50 is already connected to the wireless network 110. Further, there may be cases where the PING signal or the PING reply signal is not properly sent or received, and the first printer 10 cannot receive the PING reply signal at step A32 (specifically, the case where PING reply signal cannot be received even if the first printer 10 performs step A30 continuously for a predetermined time). In this case, the processing unit 14 of the first printer 10 outputs information indicating that the PING reply signal is not received to the display unit 18 (step A34). Thus, the display unit 18 displays a message indicating that the second printer 50 is not connected to the wireless network 110. Since communication via the wireless network 110 is attempted between the first printer 10 and the second printer 50, the user can easily learn whether or not the second printer 50 is connected to the wireless network 110. Meanwhile, as shown in the flowcharts of FIG. 2 to FIG. 4, the data outputted by the processing unit 14 at step A34 (data indicating whether or not the PING reply signal has been received) is outputted only when it is determined as 'YES' at step A24. In other words, the data outputted by the processing unit 14 at step A34 is data containing the determination result received at step A22 (specifically, containing the determination result indicating that the network wireless setting 110a can be used in the second printer 50). When step A34 and step B32 are completed, the first printer 10 and the second printer 50 terminate the processing of FIG. 4 respectively.

As described above, in the wireless connecting system 100 of the embodiment, when the second printer 50 cannot use the network wireless setting 110a, the display unit 18 of the first printer 10 displays a message indicating such a state. Therefore, the user can easily learn the reason why the second printer 50 cannot be connected to the wireless network 110 if such cause lies in the network wireless setting 110a. Thus, the user can take other measures for connecting the second printer 50 to the wireless network 110. For example, by changing the network wireless setting 110a of the wireless network 110 and by performing the wireless communication connecting processing again, the second printer 50 can be connected to the wireless network 110.

Further, after the wireless communication connecting processing shown in FIG. 2 and FIG. 3, the wireless connecting system 100 performs a network connection verifying processing shown in FIG. 4 for verifying whether or not the second printer 50 is properly connected to the wireless network 110. Therefore, the user can easily learn whether or not the second printer 50 is connected to the wireless network 110.

Further, in the wireless connecting system 100, the first printer 10 stores the ad-hoc wireless setting database 32 (specifically, a plurality of ad-hoc wireless setting patterns associated with unique device identification data). Then, the first printer 10 receives device identification data broadcasted from another network apparatus, and can identify an ad-hoc wireless setting corresponding to the received device identification data. Therefore, the first printer 10 can connect various network apparatuses to the wireless network 110 in addition to the second printer 50.

Further, the first printer 10 determines whether or not the network connection setting 110c input at step A10 is adaptive to the network connection setting 110b of the first printer 10. Then, in the case where it is determined that the inputted network connection setting 110c is not adaptive to the network connection setting 110b of the first printer 10, the user is allowed to select whether send wirelessly or not the network connection setting 110c to the second printer 50. Therefore, the user who is not familiar with wireless LAN communication can re-input the network connection setting 110c that is adaptive to the network connection setting 110b of the first printer 10. Further, the user who is familiar with wireless LAN communication can send a preferable network connection setting 110c for the second printer 50 to the second printer 50 even if it is not adaptive to the network connection setting 110b of the first printer 10.

Meanwhile, in the above example, the case where the first printer 10 is connected to the wireless network 110 wirelessly communicating via the access point 90 (specifically, wireless network by the infrastructure mode) is described. However, even in a case where the first printer 10 is connected to a wireless network of another mode, the second printer 50 can be connected to the wireless network with the employment of similar processes as those described above. Assume, for example, that the first printer 10 is connected to wireless network in which ad-hoc wireless communication is performed among a plurality of network apparatuses in accordance with an identical ad-hoc wireless setting. In this case, by wirelessly sending an ad-hoc wireless setting commonly used in the wireless network from the first printer 10 to the second printer 50, the second printer 50 can be connected to the wireless network in accordance with the received ad-hoc wireless setting.

Further, in the above-described example, the wireless network 110 includes a plurality of network apparatuses in addition to the first printer 10 and the access point 90. However, the wireless network may be constituted only by the first printer 10 and another network apparatus. For example, the access point 90 may be wired connected to another network such as the Internet, and the wireless network may be constituted only of the access point 90 (i.e., one kind of another network apparatus) and the first printer 10. In this case, the first printer 10 is communicable with another network via the access point 90. Further, connecting the second printer 50 to the wireless network allows the second printer 50 to communicate with the first printer 10 or the aforementioned another network wired connected to the access point 90 via the access point 90. As described, the wireless network may include configurations of which only the first printer 10 and another network apparatus constitute (the access point 90 or the like). Furthermore, the above example illustrated a wireless network (the wireless network 110) that is constituted of a printer (first printer 10) and an access point 90, and a case in which another printer (second printer 50) is additionally connected to the wireless network. However, the wireless connecting system 100 may be materialized likewise even in a case where the wireless network 110 is constituted of network apparatuses such as personal computer, scanner and the like, other than a printer and an access point, and network apparatus is to be additionally connected thereto.

A part of technique disclosed in the above embodiment will be described.

The determination result outputting device may be constituted so as to output the determination result in a case where a negative determination result is obtained (a positive determination result may not be outputted therefrom). Specifically, in a case where the determination result receiving device received the determination result indicating that the network wireless setting cannot be used in the second network apparatus, the determination result outputting device may output the determination result. On the other hand, the determination result outputting device may output the positive determination result and not output the negative determination result. Even in this case, the user can learn of the negative determination when the determination result is not outputted. Further, the determination result outputting device may output both of the positive determination result and the negative determination result.

Even in the case where the positive determination result has been obtained, there may be cases where the second network apparatus is not connected to the wireless network due to various reasons. For example, there may be a case where connection setting set to the second network apparatus (for example, IP address of the second network apparatus) is not adaptive to the existing wireless network. In this case, even if the second network apparatus supports the network wireless setting of the wireless network, the second network apparatus may not be connected to wireless network. Therefore, the second network apparatus may have the following constitution in order to verify that the second network apparatus is connected to the wireless network.

The first network apparatus may further comprise a verify signal sending device, a reply signal receiving device, and a reply result outputting device. The second network apparatus may further comprise a verify signal receiving device and a reply signal sending device. The verify signal sending device of the first network apparatus sends a verify signal to the second network apparatus using the network wireless setting stored in the network wireless setting storing device in a case where the determination result receiving device receives the determination result indicating that the network wireless setting is adaptive in the second network apparatus. The verify signal receiving device of the second network apparatus receives the verify signal sent from the first network apparatus using the network wireless setting received by the network wireless setting receiving device. The reply signal sending device of the second network apparatus sends a reply signal to the first network apparatus using the network wireless setting received by the network wireless setting receiving device in a case where the verify signal receiving device receives the verify signal. The reply signal receiving device of the first network apparatus receives the reply signal from the second network apparatus using the network wireless setting stored in the network wireless setting storing device. Then, the reply result outputting device of the first network apparatus outputs information indicating that the reply signal has been received in a case where the reply signal receiving device has received the reply signal, and outputs information indicating that the reply signal has not been received in a case where the reply signal receiving device has not received the reply signal.

In this wireless connecting system, in the case where the determination result receiving device received a determination result indicating that the network wireless setting is adaptive in the second network apparatus, wireless communication in accordance with the network wireless setting is performed between the first network apparatus and the second network apparatus. Specifically, the verify signal is sent from the first network apparatus to the second network apparatus. When the second network apparatus received the verify signal, the reply signal is sent from the second network apparatus to the first network apparatus. Sending and receiving of the verify signal and the reply signal are performed successfully, if the second network apparatus is connected to the wireless network. Therefore, depending on whether or not the first network apparatus received the reply signal, the user can learn whether or not the second network apparatus has been connected to the wireless network. The reply result outputting device of the first network apparatus outputs whether or not the first network apparatus received the reply signal (as for the term "output", refer to the above definition). Therefore, whether or not the second network apparatus is connected to the wireless network can be easily verified by means of the output. For example, the user can easily learn of this through the display of the LCD indicating the receiving of the reply signal.

In the above-described wireless connecting system, various network apparatuses can be used as the second network apparatus. In this case, usable ad-hoc wireless setting may vary depending on a product type of network apparatus. The following constitution may be employed in order to allow the first network apparatus to perform wireless communication using the ad-hoc mode with the second network apparatus of various product types. The first network apparatus may further comprise an identification information receiving device and an ad-hoc wireless setting identifying device. Further, the second network apparatus may further comprise an identification information storing device and an identification information sending device. The first ad-hoc wireless setting storing device of the first network apparatus is configured to store a plurality of patterns of ad-hoc wireless setting. Each pattern of the ad-hoc wireless setting corresponds to unique identification information. The identification information storing device of the second network apparatus stores an identification information of the second network apparatus. The identification information sending device of the second network apparatus broadcasts wirelessly the identification information stored in the identification information storing device. The identification information receiving device of the first network apparatus receives the identification information sent from the second network apparatus. The ad-hoc wireless setting identifying device of the first network apparatus identifies, from the plurality of patterns of the ad-hoc wireless setting stored in the first ad-hoc wireless setting storing device, an ad-hoc wireless setting corresponding to the identification information received by identification information receiving device. The network wireless setting sending device and the determination result receiving device of the first network apparatus communicate with the second network apparatus using the ad-hoc wireless setting identified by the ad-hoc wireless setting identifying device.

In this wireless connecting system, the first ad-hoc wireless setting storing device of the first network apparatus stores a plurality of patterns of ad-hoc wireless setting. Each pattern of the ad-hoc wireless setting is associated with the device identification information. For connecting the second network apparatus to the wireless network, the second network apparatus broadcasts its device identification information. "Broadcast" means sending information to an unspecified network apparatus. After receiving the identification information broadcasted, the first network apparatus identifies, from the plurality of patterns of ad-hoc wireless setting, an ad-hoc wireless setting corresponding to the received identification information. Then, the first network apparatus communicates with the second network apparatus using the identified ad-hoc wireless setting. Specifically, the first network apparatus can identify an ad-hoc wireless setting which is adaptive in the second network apparatus and communicate wirelessly in accordance with the identified ad-hoc wireless setting. Therefore, various types of second network apparatus with various usable ad-hoc wireless setting can be connected to the wireless network.

Further, the first network apparatus may further comprise a connection setting inputting device to which a connection setting is to be input. The network wireless setting sending device may send the network wireless setting stored in the network wireless setting storing device and the connection setting input to the connection setting inputting device to the second network apparatus. Note that the connection setting is information (IP address, for example) used for identifying a network apparatus when the network apparatus performs communication.

In a case where the first network apparatus is configured to send the connection setting, the first network apparatus may further comprise a connection setting determination device and a selecting device. The connection setting determination device determines whether or not the connection setting input to the connection setting inputting device is adaptive to the connection setting of the first network apparatus. The selecting device allows a user to select whether or not to send the connection setting input to the connection setting inputting device to the second network apparatus in a case where the connection setting determination device determines that the connection setting input to the connection setting inputting device is not adaptive to the connection setting of the first network apparatus. The network wireless setting sending device may send the connection setting input to the connection setting inputting device to the second network apparatus, in a case where the connection setting determination device determines that the connection setting input to the connection setting inputting device is adaptive to the connection setting of the first network apparatus and in a case where the user selects to send the connection setting input to the connection setting inputting device in the selecting device.

In this wireless connecting system, whether or not the connection setting input to the connection setting inputting device is adaptive to the connection setting of the first network apparatus is determined. In a case where it is determined to be adaptive, the connection setting input to the connection setting inputting device is sent to the second network apparatus. On the other hand, even when the input connection setting is not adaptive to the connection setting of the first network apparatus, there may be a case where the connection setting is preferable for use in the second network apparatus. Therefore, the first network apparatus may allow the user to select whether or not the connection setting, which has been determined to be not adaptive to the connection setting of the first network apparatus, is sent to the second network apparatus. Then, in a case where the user selected to send the connection setting input to the connection setting inputting device to the second network apparatus, the connection setting is sent to the second network apparatus. Since the wireless connecting system is constituted in this manner, in a case where the inputted connection setting is determined to be not adaptive to the connection setting of the first network apparatus, the user who is not familiar with connection setting may select not to send the connection setting to the second network apparatus. Further, with the employment of the above constitution, the user who is familiar with the connection setting can send a preferable connection setting to the second network apparatus even if the input setting is not adaptive to the connection setting of the first network apparatus.

The above-described connection setting may include an IP address and a subnet mask. The connection setting may include other information. Further, the above-described network wireless setting may include a network ID of the wireless network, an authentication scheme used in the wireless network, and an encryption scheme used in the wireless network. Note that the network wireless setting may include other information. Further, the above-described ad-hoc wireless setting may include an ad-hoc ID used in ad-hoc wireless communication, an authentication scheme used in ad-hoc wireless communication, and an encryption scheme used in ad-hoc wireless communication. Note that the ad-hoc wireless setting may include the other information.

The above-described wireless network may be a wireless network of an infrastructure mode. Further, the above-described wireless network may be a wireless network of an ad-hoc mode.

The first network apparatus may comprise a wireless setting storing device, a sending/receiving device, and a backup device. The network wireless setting sending device and a determination result receiving device may be constituted of the sending/receiving device. The wireless setting storing device may store one wireless setting. The sending/receiving device may communicate wirelessly using the wireless setting stored in the wireless setting storing device. Specifically, when an ad-hoc wireless setting is stored in the wireless setting storing device, the sending/receiving device may communicate wirelessly using the ad-hoc wireless setting. When a network wireless setting is stored in the wireless setting storing device, the sending/receiving device may communicate wirelessly using the network wireless setting. In a case where the sending/receiving device communicates wirelessly using the ad-hoc wireless setting, the ad-hoc wireless setting may be stored in the wireless setting storing device. In a case where the ad-hoc wireless setting is stored in the wireless setting storing device, the backup device may store a wireless setting that has been stored in the wireless setting storing device heretofore.

Further, the network apparatus may have the following constitution. The network apparatus comprises a network wireless setting storing device, an ad-hoc wireless setting storing device, a network wireless setting sending device, a verify signal sending device, a reply signal receiving device, and a reply result outputting device. The network wireless setting storing device is configured to store a network wireless setting for communicating wirelessly using a wireless network. The ad-hoc wireless setting storing device is configured to store an ad-hoc wireless setting. The network wireless setting sending device is configured to send the network wireless setting to other network apparatus using the ad-hoc wireless setting. The verify signal sending device is configured to send a verify signal to the other network apparatus using the network wireless setting. The reply signal receiving device is configured to receive a reply signal using the network wireless setting, in a case where the reply signal is sent by the other network apparatus in response to the verify signal. The reply result outputting device is configured to output information indicating that the reply signal has been received in a case where the reply signal receiving device has received the reply signal, and output information indicating that the reply signal has not been received in a case where the reply signal receiving device has not received the reply signal.

Further, the network apparatus may have the following constitution. The network apparatus comprises an ad-hoc wireless setting storing device, a network wireless setting receiving device, a verify signal receiving device, and a reply signal sending device. The ad-hoc wireless setting storing device is configured to store an ad-hoc wireless setting. The network wireless setting receiving device is configured to receive a network wireless setting using the ad-hoc wireless setting in a case where the network wireless setting is sent by other network apparatus. The received network wireless setting is to be used in communicating wirelessly using the wireless network. The verify signal receiving device is configured to receive a verify signal from the other network apparatus using the network wireless setting in a case where the verify signal is sent by other network apparatus. The reply signal sending device is configured to send a reply signal to the other network apparatus using the network wireless setting in a case where the verify signal receiving device receives the verify signal.

What is claimed is:

1. A wireless connecting system for connecting a network apparatus to a wireless network, the wireless connecting system comprising:
a first network apparatus connected to the wireless network; and
a second network apparatus to be connected to the wireless network, the second network apparatus being configured to communicate wirelessly,
wherein the first network apparatus comprises:
a first processor;
a first memory configured to store a first computer program executed by the first processor;
a network wireless setting storing memory area configured to store a network wireless setting for communication wirelessly using the wireless network; and
a first ad-hoc wireless setting storing memory area configured to store an ad-hoc wireless setting,
the second network apparatus comprises:
a second processor;

a second memory configured to store a second computer program executed by the second processor; and a second ad-hoc wireless setting storing memory area configured to store the same ad-hoc wireless setting as that stored in the first ad-hoc setting storing memory area, wherein the first computer program, when executed by the first processor, causes the first processor to function as:

a network wireless setting sending device configured to send the network wireless setting stored in the network wireless setting storing memory area to the second network apparatus using the ad-hoc wireless setting;

a determination result receiving device configured to receive a determination result from the second network apparatus using the ad-hoc wireless setting;

a determination result outputting device configured to output the determination result received by the determination result receiving device; and a first wireless setting changing device configured to change a wireless setting used by the first network apparatus from the ad-hoc wireless setting to the network wireless setting after the determination result receiving device receives the determination result from the second network apparatus using the ad-hoc wireless setting, wherein the second computer program, when executed by the second processor, causes the second processor to function as:

a network wireless setting receiving device configured to receive the network wireless setting from the first network apparatus using the ad-hoc wireless setting;

a determination device configured to determine whether the network wireless setting received by the network wireless setting receiving device is adaptive in the second network apparatus;

a determination result sending device configured to send the determination result achieved by the determination device to the first network apparatus using the ad-hoc wireless setting; and a second wireless setting changing device configured to change a wireless setting used by the second network apparatus from the ad-hoc wireless setting to the network wireless setting after the determination result sending device sends the determination result to the first network apparatus using the ad-hoc wireless setting.

2. The wireless connecting system as in claim 1, wherein the determination result outputting device outputs the determination result in a case where the determination result receiving device receives the determination result indicating the network wireless setting is not adaptive in the second network apparatus.

3. The wireless connecting system as in claim 1, wherein the first computer program, when executed by the first processor, further causes the first processor to function as a verify signal sending device, a reply signal receiving device, and a reply result outputting device, the second computer program, when executed by the second processor, further causes the second processor to function as a verify signal receiving device and a reply signal sending device, the verify signal sending device sends a verify signal to the second network apparatus using the network wireless setting stored in the network wireless setting storing memory area in a case where the determination result receiving device receives the determination result indicating the network wireless setting is adaptive in the second network apparatus, the verify signal receiving device receives the verify signal from the first network apparatus using the network wireless setting received by the network wireless setting receiving device, the reply signal sending device sends a reply signal to the first network apparatus using the network wireless setting received by the network wireless setting receiving device in a case where the verify signal receiving device receives the verify signal, the reply signal receiving device receives the reply signal from the second network apparatus using the network wireless setting stored in the network wireless setting storing memory area, and the reply result outputting device outputs information indicating that the reply signal has been received in a case where the reply signal receiving device has received the reply signal, and outputs information indicating that the reply signal has not been received in a case where the reply signal receiving device has not received the reply signal.

4. The wireless connecting system as in claim 1, wherein the first computer program, when executed by the first processor, further causes the first processor to function as an identification information receiving device and an ad-hoc wireless setting identifying device, the second network apparatus further comprises an identification information storing memory area configured to store identification information of the second network apparatus, the second computer program, when executed by the second processor, further causes the second processor to function as an identification information sending device, the first ad-hoc wireless setting storing memory area is configured to store a plurality of patterns of the ad-hoc wireless setting, each pattern of the ad-hoc wireless setting corresponds to unique identification information, the identification information sending device broadcasts wirelessly the identification information stored in the identification information storing memory area, the identification information receiving device receives the identification information from the second network apparatus, the ad-hoc wireless setting identifying device identifies, from the plurality of patterns of the ad-hoc wireless setting stored in the first ad-hoc wireless setting storing memory area, an ad-hoc wireless setting corresponding to the identification information received by the identification information receiving device, and the network wireless setting sending device and the determination result receiving device communicate with the second network apparatus using the ad-hoc wireless setting identified by the ad-hoc wireless setting identifying device.

5. The wireless connecting system as in claim 1, wherein the first network apparatus further comprises a connection setting inputting device to which a connection setting is to be input, and the network wireless setting sending device sends the network wireless setting stored in the network wireless setting storing memory area and the connection setting input to the connection setting inputting device to the second network apparatus.

6. The wireless connecting system as in claim 5, wherein the first computer program, when executed by the first processor, further causes the first processor to function as a connection setting determination device and a selecting device, the connection setting determination device determines whether the connection setting input to the connection setting inputting device is adaptive to a connection setting of the first network apparatus, the selecting device allows a user to select whether to send the connection setting input to the connection setting inputting device to the second network apparatus in a case where the connection setting determination device determines that the connection setting input to the connection setting inputting device is not adaptive to the connection setting of the first network apparatus, and the network wireless setting sending device sends the connection setting input to the connection setting inputting device to the second network apparatus in a case where the connection setting determination device determines that the connection setting input to the connection setting inputting device is adaptive to the connection setting of the first network apparatus, and in a case where the user selects to send the connection setting input to the connection setting inputting device.

7. The wireless connecting system as in claim 5, wherein the connection setting includes an IP address and a subnet mask.

8. The wireless connecting system as in claim 1, wherein the network wireless setting includes a network ID, an authentication scheme, and an encryption scheme that are used in the wireless network.

9. The wireless connecting system as in claim 1, wherein the ad-hoc wireless setting includes an ad-hoc ID, an authentication scheme, and an encryption scheme that are used in an ad-hoc wireless communication.

10. The wireless connecting system as in claim 1, wherein the wireless network is a network using an infrastructure mode.

11. The wireless connecting system as in claim 1, wherein the determination device is configured to determine, in a state where the ad-hoc wireless setting is usable for the second network apparatus to communicate, whether the network wireless setting received by the network wireless setting receiving device is adaptive in the second network apparatus by determining whether an authentication scheme and an encryption scheme included in the network wireless setting received by the network wireless setting receiving device are supported by the second network apparatus.

12. A network apparatus configured to be connected to a wireless network, the network apparatus comprising:
 a processor;
 a memory configured to store a computer program executed by the processor;
 a network wireless setting storing memory area configured to store a network wireless setting for communicating wirelessly using the wireless network; and
 an ad-hoc wireless setting storing memory area configured to store an ad-hoc wireless setting;
 wherein the computer program, when executed by the processor, causes the processor to function as:
  a network wireless setting sending device configured to send the network wireless setting to another network apparatus using the ad-hoc wireless setting;
  a determination result receiving device configured to receive a determination result using the ad-hoc wireless setting in a case where the determination result is sent by the other network apparatus, wherein the determination result indicates whether the network wireless setting is adaptive to the other network apparatus;
  a determination result outputting device configured to output the determination result received by the determination result receiving device, and
  a wireless setting change device configured to change a wireless setting used by the network apparatus from the ad-hoc wireless setting to the network wireless setting after the determination result receiving device receives the determination result using the ad-hoc wireless setting.

13. A network apparatus configured to be connected to a wireless network, the network apparatus comprising:
 a processor;
 a memory configured to store a computer program executed by the processor; and
 an ad-hoc wireless setting storing memory area configured to store an ad-hoc wireless setting;
 wherein the computer program, when executed by the processor, causes the processor to function as:
  a network wireless setting receiving device configured to receive a network wireless setting using the ad-hoc wireless setting in a case where the network wireless setting is sent by another network apparatus, wherein the received network wireless setting is to be used in communicating wirelessly using the wireless network;
  a determination device configured to determine whether the network wireless setting is adaptive in the network apparatus;
  a determination result sending device configured to send the determination result achieved by the determination device to the other network apparatus using the ad-hoc wireless setting, and
  a wireless setting change device configured to change a wireless setting used by the network apparatus from the ad-hoc wireless setting to the network wireless setting after the determination result receiving device receives the determination result using the ad-hoc wireless setting.

* * * * *